UNITED STATES PATENT OFFICE.

MAJOR E. HOLMES, OF LAKEWOOD, OHIO, ASSIGNOR TO NATIONAL CARBON COMPANY, INC., A CORPORATION OF NEW YORK.

ELECTRIC-BATTERY DEPOLARIZER.

1,281,372.      Specification of Letters Patent.      Patented Oct. 15, 1918.

No Drawing. Original application filed January 7, 1916, Serial No. 70,768. Divided and this application filed February 21, 1918. Serial No. 218,434.

*To all whom it may concern:*

Be it known that I, MAJOR E. HOLMES, a citizen of the United States, residing at Lakewood, in the county of Cuyahoga and State of Ohio, have invented a certain new and useful Improvement in Electric-Battery Depolarizers, of which the following is a full, clear, and exact description.

This invention relates to depolarizers for dry cells and is a division of my application filed January 7, 1916, Serial No. 70,768.

In my prior application above referred to I have disclosed the properties of molybdenum trioxid as a depolarizer. The molybdates, which may be regarded as chemical combinations of molybdenum trioxid with basic oxids or salts, are less soluble in the cell electrolyte than is molybdenum trioxid, and inasmuch as insolubility is a very valuable characteristic in depolarizers, I propose to use molybdates in a dry cell for this purpose.

There are various molybdates that may be used, but I prefer the molybdates of sodium and lead or double molybdates such as ammonium phospho molybdate $(NH_4)_3PO_4\cdot12M_oO_3$.

Having described my invention, what I claim is:

1. In primary batteries, positive and negative electrodes and a depolarizer consisting of molybdenum trioxid combined with a basic oxid.

2. In primary batteries, positive and negative electrodes and a depolarizer consisting of ammonium phospho molybdate.

In testimony whereof, I hereunto affix my signature.

MAJOR E. HOLMES.